(12) United States Patent
Südkamp

(10) Patent No.: US 8,534,228 B2
(45) Date of Patent: Sep. 17, 2013

(54) FISH BASIN ARRANGEMENT HAVING A CENTRAL MEASURING DEVICE

(75) Inventor: Meik Südkamp, Lohne (DE)

(73) Assignee: Big Dutchman International GmbH, Vechta (DE)

( * ) Notice: Subject to any disclaimer, the term of this patent is extended or adjusted under 35 U.S.C. 154(b) by 298 days.

(21) Appl. No.: 13/123,047

(22) PCT Filed: Oct. 8, 2009

(86) PCT No.: PCT/EP2009/063066
§ 371 (c)(1),
(2), (4) Date: Aug. 1, 2011

(87) PCT Pub. No.: WO2010/040793
PCT Pub. Date: Apr. 15, 2010

(65) Prior Publication Data
US 2011/0290007 A1    Dec. 1, 2011

(30) Foreign Application Priority Data
Oct. 8, 2008    (DE) .................... 20 2008 013 222 U

(51) Int. Cl.
*A01K 63/00*        (2006.01)

(52) U.S. Cl.
USPC ........................................... 119/224

(58) Field of Classification Search
USPC ................... 119/224, 225, 226, 231, 245
See application file for complete search history.

(56) References Cited

U.S. PATENT DOCUMENTS

| | | | |
|---|---|---|---|
| 3,438,356 A * | 4/1969 | Claff | 119/215 |
| 3,757,739 A * | 9/1973 | Whitener | 119/261 |
| 3,886,902 A * | 6/1975 | Haynes | 119/224 |
| 4,723,511 A * | 2/1988 | Solman et al. | 119/224 |
| 6,021,664 A | 2/2000 | Granato et al. | |
| 6,058,763 A | 5/2000 | Shedd et al. | |
| 6,393,899 B1 * | 5/2002 | Shedd et al. | 73/61.41 |
| 6,499,431 B1 | 12/2002 | Lin et al. | |
| 6,988,394 B2 * | 1/2006 | Shedd et al. | 73/61.41 |
| 2003/0104353 A1 | 6/2003 | Brielmeier et al. | |
| 2008/0105210 A1 * | 5/2008 | Perry | 119/253 |

FOREIGN PATENT DOCUMENTS

| | | |
|---|---|---|
| DE | 19521037 A1 | 12/1996 |
| DE | 19961142 A1 | 7/2000 |
| WO | 2006042371 A1 | 4/2006 |

OTHER PUBLICATIONS

Eurasian Patent Organization Office Action issued in 1110494/22EA (Dec. 10, 2012).

* cited by examiner

*Primary Examiner* — Monica Williams
(74) *Attorney, Agent, or Firm* — Price Heneveld LLP

(57) ABSTRACT

A fish tank apparatus includes a plurality of fish tanks and water measuring apparatus. The water measuring apparatus includes a measuring member for detecting water parameter, and a switchable sample water diverting member having a plurality of inlets and at least one outlet. A central measurement conduit fluidically connects the outlet of the switchable sample water diverting member with the measuring member. A plurality of peripheral measurement conduits fluidically connect the fish tanks with the inlets of the switchable sample water diverting device, which is configured to selectively feed sample water from each one of the peripheral measurement conduits to the central measurement conduit to test the water in the fish tanks.

15 Claims, 2 Drawing Sheets

FISH BASIN ARRANGEMENT HAVING A CENTRAL MEASURING DEVICE

BACKGROUND OF THE INVENTION

The present invention relates generally to aquaculture, and more specifically to a fish tank system or apparatus, comprising a plurality of fish tanks and a measuring device for detecting at least one parameter of the water in the fish tanks. Another aspect of the present invention is a measuring device for such a fish tank system and related method for monitoring a plurality of fish tanks.

Overfishing of natural fish reserves and the associated stagnation, or even decline of fisheries yields, necessitates the relocation of fish production to other fields, and the refinement of such alternative fish production methods.

The possibilities of fish breeding and fish feeding in aquacultures basically provides a meaningful alternative to fishing natural fish stocks, and thus permits the preservation of natural fish stocks. In the course of history, several holding systems have been developed for producing aquatic organisms. These include classic fish ponds, launder systems, net pens and recirculation systems. Aquaculture production has increased steadily worldwide in recent years, while fisheries yields have stagnated as a result of the generally uncontrolled fishing and pollution of waterbodies.

In recirculation systems, and to a certain extent in other holding systems as well (ponds, launder systems or net pen aquaculture), ensuring abiotic parameters is a major challenge. This includes the constant maintenance of good water quality in the holding system. Constructing a fish tank with a three-part structure comprising a sedimentation section, a bioreactor section and a fish holding section between these two sections is generally known from DE 195 21 037 A1. Water flows in a constant stream through the three sections, in a sequence defined by the geometrical layout, which is from the bioreactor section into the fish holding section and on to the sedimentation section. Solids are sedimented out of the water in the sedimentation section, and can then be removed from circulation via a discharge line disposed in the bottom of the sedimentation section. In the bioreactor section, enrichment of the water with oxygen is achieved by injecting air, and intensive decomposition of organic matter by microorganisms is achieved.

Yet environmental factors, fish population growth in the fish tank and other, temporary events, such as feeding at periodic intervals, may lead to water parameters that are important for the health and development of the fish, such as oxygen, pH, nitrite concentration, fluctuating and leaving a predetermined optimal range.

Removing a water sample from a fish tank and analysing the water sample in order to adjust the above noted water parameters on the basis of such analysis is a known way of avoiding the aforementioned disadvantages. However, such testing has the disadvantage that the analysis of each individual fish tank at the required frequency would lead to aquaculture operations that are uneconomical, at least in large aquacultures comprising several fish tanks.

SUMMARY OF THE INVENTION

One object of the present invention is to provide a fish tank system or apparatus which allows simplified and also economical monitoring of the relevant parameters for the quality of water in the fish tanks.

This object is solved according to the present invention by providing a fish tank arrangement of the kind initially specified, in which the measuring device comprises:

- a measuring apparatus or unit for detecting at least one water parameter of the fish tanks,
- a switchable sample water diverting member or device which is fluidically connected by means of a central measurement line to the measuring apparatus for conducting sample water,
- a plurality of peripheral measurement conduits or lines, each of which fluidically connects a respective fish tank to the switchable sample water diverting device for conducting sample water,
- the switchable sample water diverting device being configured to feed sample water selectively from each one of the peripheral measurement lines to the central measurement line.

A number of advantages are achieved with the fish tank arrangement according to the present invention. Firstly, the manual removal of samples from a fish tank, and subsequent analysis of the sample is simplified, to the extent that sample water is taken from the respective fish tank via a sample water removal line, and can be fed directly to a measuring unit for analysis. This basically permits an automatic water analysis procedure that does not require any manual intervention, and hence can also be controlled in such a way that the analysis of the water can be carried out in regular, predetermined intervals.

It should be understood in this regard that the fish tanks according to the invention are breeding tanks. These typically and preferably have a total volume of 15-23 m3, preferably 20 m3. Of that total, 4-6 m3 is typically for the bioreactor section, in particular 5 m3, 8-12 m3 for the fish holding section, in particular 10 m3, and 3-5 m3 for the sedimentation section, in particular 4 m3.

Secondly, however, the fish tank arrangement according to the present invention avoids the need for many sensors with such automated measurement technology in order to monitor every tank. According to one feature of the present invention, a switchable sample water diverting device is provided with which samples from several fish tanks can be selectively fed to a single measuring unit and analyzed therein. It is possible by this embodiment to reduce significantly the number of sensors needed for analysing a plurality of fish tanks, in that only one sensor is needed for each respective measurement task, for example, one temperature sensor, one pH sensor, and so on. This also allows complex analytical procedures to be provided without having to provide multiple costly sensor systems, since the investment in only one sensor system pertains to a plurality of fish tanks.

More particularly, the switchable sample water diverting device which is provided in accordance with the invention may have a number of connectors for peripheral measurement lines corresponding to the number of fish tanks to be metrologically included. It is basically preferred that all the fish tanks in a fish tank arrangement be separately captured metrologically, but if there is a constant flow of water through the fish tanks in a water circuit, and the fish tanks are in a continuous exchange of water with each other, then sufficient monitoring can also be achieved, if need be, but metrologically monitoring only a selection of fish tanks, for example only every other fish tank, rather than every single fish tank.

The connectors for the peripheral measurement lines are designed to interact with a respective switching element inside the switchable sample water diverting device. Consequently, the breeding water from any peripheral measurement line can be conducted to the central measurement line, and thus be shut off or blocked in all other peripheral measurement lines connected to the switchable sample water diverting device. Such a sample water diverting device may be configured, for example, as a switchable multiport valve, which selectively connects one of a plurality of connectors to a central connector, thus shutting off or blocking all other connectors. Alternatively, it is also possible for each of the connectors for the peripheral measurement lines be connected within the sample water diverting device to a shutoff valve and to a collector line located downstream from the shutoff valve which then opens into a central measurement line. In this embodiment, by opening only one of the shutoff valves, the sample water can be fed from the respective peripheral measurement line connected to that shutoff valve through the distribution device in the central measurement line, while all the other shutoff valves remain closed. Other embodiments of the sample water diverting device are advantageous in specific applications and are included in the present invention.

The fish tank arrangement according to the present invention allows the entire sensor system to be disposed in a separate location or space that is separated from the fish tanks, wherein the space may also accommodate other control and regulation equipment for the fish tank system. The measurement lines leading to the central measurement space may extend for a substantial length within the fish tank system, depending on the size and quantity of the fish tanks. The switchable sample water diverting device may be disposed in the immediate vicinity of the fish tanks, and the central measurement line may extend from there to the central measuring unit, or all the peripheral measurement lines may extend as far as the space in which the central measuring unit is disposed, and the switchable sample water diverting device may then be disposed in that space also.

By subdividing the sample water diverting device into a plurality of separate sample water diverting devices, an appropriate hybrid form is also made possible, in which, for example, the peripheral measurement lines of a specified number of fish tanks are fed to a first switchable sample water diverting device, which is then connected to a second sample water diverting device to which, in turn, other sample water diverting devices are connected which are connected to other fish tanks via peripheral measurement lines. A central measurement line can then lead from the second switchable sample water diverting device to the measuring unit. In this case, the sample water is conducted from one fish tank via two successive switchable sample water diverting devices to the measuring unit, and it should be understood that both sample water diverting devices must be switched accordingly in order to measure the parameters of each individual fish tank.

A first preferred embodiment of the fish tank apparatus arrangement according to the invention is characterized in that the measuring unit comprises
- at least one physical measuring sensor which converts a parameter of the sample water directly into an electrical signal, in particular a pH sensor, an oxygen sensor, a gas pressure sensor which detects the total gas pressure of the breeding water, as a sum of the partial pressures against the surrounding air pressure, and/or a temperature sensor, and/or
- at least one wet chemical measuring unit which converts a parameter of the sample water into an electrical signal after addition of at least one reagent, in particular a measuring unit for detecting the orthophosphate ($PO_4^{3-}$) and total phosphate content, a measuring unit for detecting the hydrocarbonate ($CaCO_3$, $HCO_3$) content, a measuring unit for detecting individual nitrogen compounds (ammonia, nitrite and nitrate content) as well as the total nitrogen content, and/or a measuring unit for detecting all organic carbon compounds (TOC; total organic carbon).

One preferred embodiment of the present invention combines physical and wet-chemical analytical methods, which is advantageous for the fish tank arrangement according to the invention, since a large number of fish tanks can be metrologically monitored using a single sensor of the respective analysis type. It should be understood in this regard that the sensors and measuring units may be arranged in series or in parallel, so that water flows through the entire measuring unit, for example by disposing certain sensors or measuring units in a bypass for actually conducting or discontinuously branching off the sample water. The sensors or measuring units may be of the continuously measuring or discontinuously measuring type.

It is further preferred that the measuring unit be fluidically connected via at least one return line to a fish tank, so that the sample water can be returned to the tanks.

This embodiment of the present invention allows the return of the water that was removed from the fish tank for analysis, and also, where relevant, for rinsing the measuring unit, and therefore reduces the need for an increased supply of fresh water to the fish tanks, in contrast to arrangements in which the water used for analysis is simply discarded.

It is particularly preferred to use an ozone generator for water disinfection, which is inserted into the return line in the direction of flow between the measuring unit and the fish tank. This configuration is suitable, for preventing the propagation of diseases among the populations in the individual fish tanks as a result of sample removal, and for killing any germs that get into the sample water in the course of analysis, particularly whenever several fish tanks are metrologically monitored, and the sample water removed from a fish tank for this purpose is not necessarily returned to the same fish tank.

It is still further preferred that the fish tank arrangement according to the present invention include a switchable return water diverting device, which is fluidically connected by a central return line to the measuring unit, in order to return sample water, and includes a plurality of peripheral return lines, each of which fluidically connects the switchable return water diverting device to a respective fish tank or to a circuit of fish tanks, wherein the switchable return water diverting device is configured to feed sample water selectively from the central return line to a peripheral return line. This embodiment permits the sample water to be fed back to the respective tank from which it was removed, or at least to a tank which is adjacent thereto, or which is disposed in the same circuit as the fish tank from which the sample water was removed. A switchable diverting device is used in the same manner as when removing the sample, thus achieving proper assignment of the sample water being returned. It should be understood in this regard that the number of peripheral return lines need not necessarily be the same as the number of peripheral measurement lines, but that it may suffice, also for functionality, if a peripheral measurement line is available for each fish tank, but a smaller number of peripheral return lines are available, each for a group of fish tanks that are interconnected in a circuit.

It is still further preferred that the fish tanks, the peripheral measurement lines and the central measurement line be arranged in such a way that the sample water from the fish tanks is fed to the measuring unit using only gravity feed, and the measuring device is disposed upstream from a positive displacement pump for conveying the sample water. This embodiment avoids having to use a powered conveyor device, such as a pump or the like, between the fish tank and the measuring unit, in order to convey the sample water from the fish tank to the measuring unit. Instead, the sample water flows from the fish tank as far as the measuring unit due to the influence of gravity, which specifically prevent certain parameters, such as the gas pressure in the liquid, from being falsified. For further conveying of the sample water, be it to return the sample water to one of the fish tanks or for disposing of the sample water, a positive displacement pump is provided downstream from the measuring device, the pump being able to convey the water flowing to it under the influence of gravity against downstream flow resistances or gradient resistances, but without exerting any pressure on the sample water inflow path, which in turn is advantageous for unfalsified measurement.

According to another preferred embodiment of the present invention, the fish tank arrangement has a measurement control unit, which has a signal connection to the switchable sample water diverting device and to the measuring unit, and which is configured to perform the following successive steps for each fish tank that is fluidically connected via a peripheral measurement line to the switchable sample water diverting device:

a. transmitting a first switching signal to the switchable sample water diverting device for conducting sample water from the peripheral measurement line of the respective fish tank into the central measurement line,
b. sending, where relevant, a start signal to the measuring unit to initiate a measurement in the measuring unit,
c. detecting the values measured by the measuring unit and storing and/or forwarding the measured values,
d. wherein the measurement control unit is configured to transmit prior thereto a second switching signal to the switchable return water diverting device, in order to conduct sample water from the central return line to the peripheral return line assigned to the respective fish tank, and
e. wherein the measurement control unit preferably comprises a time-delay unit, and is configured to allow a period of time, predetermined by the time-delay unit, to elapse between transmission of the first switching signal and transmission of the start signal, wherein the period being sufficient for the central measurement line and the measuring unit to be completely filled with sample water from the fish tank being measured, wherein the measurement control unit is configured to perform steps a-c and, if necessary, d and/or e successively for each of the fish tanks.

This embodiment allows automatic monitoring of the water quality in a fish tank system having a plurality of fish tanks, by using a central measuring unit and a measurement control unit which controls the successive removal of samples and analysis of the samples from the individual fish tanks. This monitoring can be designed in such a way that all the fish tanks are successively analyzed, one immediately after the other, in a first measurement cycle, the interval between two such analyzed being at least the required period of time required for analysis of one fish tank and for subsequently rinsing the measurement lines. This first measurement cycle may then be followed after a predetermined time interval, for example two hours, by a second and respective further measurement cycles in which each and every fish tank is analyzed. It is not essential that every water parameter be checked in every measurement cycle. Certain water parameters, particularly those that are not subject to short-term fluctuation during normal operation, may be analyzed only once every two, three or more measurement cycles instead.

It is still further preferred that a control unit be provided which has a signal connection to the measuring unit, and which is configured to compare the values measured by the measuring unit with setpoint values and, in the event that the measured values deviate from the setpoint value, to output a signal indicating which measured value is deviating. With this feature, not only is automated measurement of the water quality achieved, but also the possibility of selective correction of any water quality deviating from the setpoint value. The outputted signal may specifically be used to indicate to an operator of the fish tank system, the type and amount of particular substances that need to be added. It is also possible to apply the signals outputted by the control unit to increase or decrease specific parameters, such as the supply of fresh water to a fish tank or the air supply to the oxygen-enriching bioreactor, in order to keep particular water quality parameter within the set range.

It is particularly preferred in this regard that the control unit is configured to output a correcting variable for adding a substance to the fish tank being measured, wherein the correcting variable being designed that when the substance is added to the fish tank, the measured parameter is changed in the direction of the setpoint value, and is preferably changed to the setpoint value, wherein the control unit preferably has a signal coupling to a dosing unit for dosing the substance. This feature makes it easier for a user of the fish tank system to maintain good water quality, while also achieving further automation of water quality monitoring and maintenance, in particular by supplying an increased or decreased amount of particular substances, such as fresh water or chemical or biological reagents, to fish tanks, or to a water circuit formed by the fish tanks, by a dosing unit.

According to yet another preferred embodiment, all of the fish tanks, or some of the fish tanks, are interconnected to form a semi-closed water circuit. The control unit may be configured to output a correcting variable for adding a substance to a fish tank which fluidically in the water circuit immediately precedes the fish tank being measured, wherein the control unit preferably has a signal coupling to a dosing unit for dosing the substance to the fish tank which fluidically immediately precedes the fish tank being measured. This embodiment relates to fish tank arrangements in which a plurality of fish tanks are fluidically connected, such that water discharged from one fish tank is fed to another fish tank. Such a water circuit can be produced, by coupling a plurality of fish tanks of the kind known from DE 195 21 037 A1, in such a way that water discharged from each bypass section to the sedimentation section is fed to the bioreactor section of an adjacent tank, thus forming a closed water circuit comprising two or more fish tanks. Although it is also possible in such a circuit to control the water quality in a specific fish tank, by increasing or decreasing the addition of certain substances to a specific fish tank, it is advantageous in such circuits, in certain applications, and in particular when there are sudden large deviations of actual values from the setpoint value, when the addition of substances is additionally controlled or only controlled in a fish tank which fluidically precedes that specific fish tank in the water circuit, in particular in the fish tank which immediately precedes the specific fish tank, in order to influence the water quality in the latter. In this way, it is possible to achieve more accurate compliance with predetermined setpoint values, especially in the control operations that involve a delayed biological reaction.

Finally, in yet another preferred embodiment of the present invention having a return line for returning the sample water, the supply line for dosing reagents that regulate the water quality opens into the return line, preferably upstream from a switchable return water diverting device, which selectively diverts returning sample water into one of a plurality of peripheral return lines, and connects the return lines to an automated dosing unit. Providing such a supply line for dosing allows the reagents used to restore the desired water quality in respect of one or more specific water parameters to be added to the fish tank arrangement. In the simplest case, the required reagent can be added to a plurality of fish tanks combined to form a single overall circuit, by dosing the reagent into one of the plurality of plurality of fish tanks via the return line. This configuration can be developed by returning the sample water returned via the return line by means of a return water diverting device into different target fish tanks, this permitting the reagents to be fed to one fish tank in a plurality of fish tanks which are connected via respective peripheral return line to the return water diverting device and via the latter to the return line and the dosing unit. This feature permits a plurality of fish tank groups or modules, each representing a circuit, or one fish tank arrangement comprising a plurality of circuits each containing two or more fish tanks, to be targeted with respective reagents in order to control the water quality in each individual water circuit in a targeted manner. More particularly, this embodiment may be configured in such a way that one or more reagents can be dosed to each fish tank in the fish tank arrangement, in particular by the previously described distribution device and the peripheral return lines, in order to influence the water quality in each individual fish tank in a targeted manner.

Another aspect of the present invention relates to a measuring device for an arrangement of a plurality of fish tanks, wherein the measuring comprises:
 a measuring unit for detecting the at least one water parameter,
 a switchable sample water diverting device which is fluidically connected by a central measurement line to the measuring unit for conducting sample water,
 a plurality of peripheral measurement lines, each of which fluidically connects a respective fish tank to the switchable water diverting device for conducting sample water,
the switchable sample water diverting device being configured to feed sample water selectively from a peripheral measurement line to the central measurement line. The measuring devices correspond, in respect to their technical configuration, to the measuring device of the fish tank arrangement described in the foregoing, and is specifically suitable for equipping an arrangement of several fish tanks with measurement technology that allows reliable monitoring of the water quality. It should be understood in this regard that the measuring device corresponding to this aspect of the invention can also be developed in a manner, as described above, for the measuring device of the inventive fish tank arrangement.

Another aspect of the present invention is a fish tank arrangement comprising a plurality of fish tanks and a measuring unit for detecting at least one parameter of the water in the fish tanks, wherein the fish tanks are fluidically connected via measurement lines to the measuring unit in such a way that the sample water, which is needed for measurement, is fed from the fish tanks to the measuring unit by only the influence of gravity, and the measuring device is disposed upstream from a positive displacement pump for conveying said sample water. According to this aspect of the present invention, a fish tank arrangement is provided that is equipped with a measuring device for monitoring water quality, with device being separated a distance from the fish tanks, in the same manner as in the fish tank arrangement described in the foregoing. Consequently, the sample water moves from the fish tanks to the measuring unit under the influence of gravity, and is not conveyed by a pump, which preferably does not exert any suction effect on the feed side, until downstream from the measuring unit, be it to return the sample water to the fish tanks or to dispose of it. This achieves largely unfalsified measurement of relevant water parameters, in particular the gas pressure, and prevents the conveying device, such as a suction or positive displacement pump, from having to be inserted into the feed line between the fish tanks and the measuring unit.

The inventive fish tank system may be operated, in particular, according to a method for monitoring a plurality of fish tanks comprising the following steps:
 switching the switchable sample water diverting device to conduct the sample water from a peripheral sample water line into a central measurement line,
 channeling sample water from a fish tank via the peripheral sample water line and the central measurement line to a measuring unit,
 measuring in the measuring unit at least one parameter of the water in the fish tank,
 returning the sample water to the fish tank, where relevant,
 switching the switchable sample water diverting device to conduct the sample water from a further peripheral sample water line into a central measurement line,
 conducting sample water from a further fish tank via the further peripheral sample water line to the measuring unit,
 measuring in the measuring unit at least one parameter of the water in the further fish tank, and
 returning the sample water to the further fish tank, where relevant.

With this method, a plurality of fish tanks can be monitored for quality in a particularly efficient manner by a single central measuring unit, thus permitting efficient operation of a plurality of fish tanks, while also providing the opportunity to apply more extensive and complex analytical methods in aquaculture fish breeding and fish feeding.

The method may specifically be characterized in that, between switching the switchable sample water diverting device and measuring the at least one water parameter, there is a predetermined time delay that is sufficient for the measuring unit to be completely filled with sample water from the fish tank being measured. In those cases where two successive measurement operations are performed on different fish tanks, this feature enables the sample water from the previous measurement to be firstly removed from the feed lines and the measuring unit, for the measurement lines and measuring units to be completely filled with the sample water from the subsequent fish tank to be measured, before a measurement is actually performed. This prevents measured values from being falsified by the influence of other sample water, or by mixing of sample water.

These and other advantages of the invention will be further understood and appreciated by those skilled in the art by reference to the following written specification, claims and appended drawings.

BRIEF DESCRIPTION OF THE DRAWINGS

A preferred embodiment of the invention shall now be described with reference to the Figures, in which.

DETAILED DESCRIPTION OF THE PREFERRED EMBODIMENTS

Figure 1:
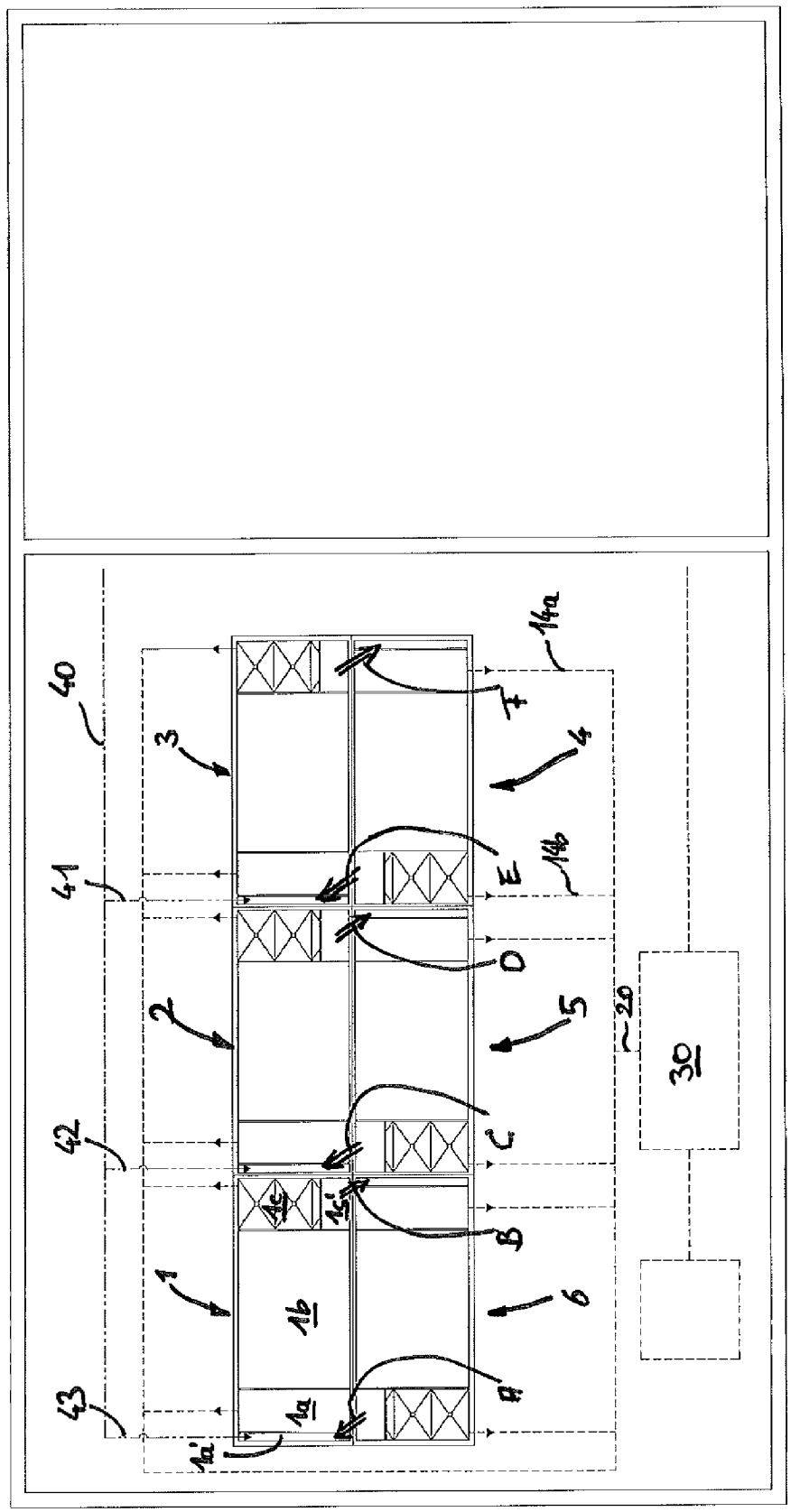
FIG. 1: shows a layout of a fish tank arrangement according to the invention, comprising six fish tanks arranged in a circulation system, with a schematic view of the water circulation, water discharge and supply of fresh water.

For purposes of description herein, the terms "upper," "lower," "right," "left," "rear," "front," "vertical," "horizontal," "top," "bottom," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiment disclosed herein are not to be considered as limiting, unless the claims expressly state otherwise.

Referring firstly to FIG. 1, a preferred embodiment of a fish tank arrangement according to the invention has a total of six fish tanks 1-6 arranged immediately adjacent to each other in two rows each containing three fish tanks 1-3, 4-6. It should be understood that the smallest unit of a module consists of two tanks of modular construction and that the modular construction allows the next size of module to consist of four tanks. The next size would then be six tanks, and so on.

As can be seen from the top left fish tank of FIG. 1 labeled with the reference number 1, each fish tank is subdivided into a bioreactor section 1a with an inflow shaft 1a', a fish holding section 1b, and a sedimentation section 1c with a bypass section 1c'. As can be seen from the drawings, the fish tanks in each row are arranged in the same direction or orientation, such that, the sedimentation section and bypass section of one fish tank is located adjacent in an endwise direction, the inflow shaft of the bioreactor section of the next adjacent tank in the same row. In contrast, the fish tanks 1-3 and 4-6 in the two rows are arranged counter or opposite to each other, such that the bypass section of the sedimentation section of a fish tank 1-3 in one row lies opposite in a sideways direction the inflow shaft and bioreactor section of the fish tank 9-6 in the adjacent row 4-6.

The two fish tanks 1 and 6 shown on the left in FIG. 1 are connected to each other to form a closed water circuit, wherein the water from the bypass section of the sedimentation section of one tank into the inflow shaft of the bioreactor section of the other tank, as indicated by arrows A, B. The two fish tanks 2, 5 in the middle are connected in the same manner to form a closed water circuit, as indicated by arrows C, D, as are the two fish tanks 3, 4 on the right, as indicated by arrows E, F. The fish tank arrangement shown in the illustrated embodiment of the present invention is thus subdivided into three separate circuits, each comprising two fish tanks. The advantage of this subdivision is that each separate circuit contains a relatively small volume of water to be controlled, which can be accordingly regulated with correspondingly small amounts of reagents in order to obtain optimal water quality. On the other hand, diseases among the fish can propagate only within one circuit, comprising two fish tanks, such that any disease arising in one fish tank can potentially endanger only a limited population of fish.

As an alternative, this arrangement of the fish tanks with short water flow paths between the tanks makes it possible to create a large water circuit, in which all six fish tanks 1-6 are included. In this case, the breeding water is conducted out of the bypass section of a sedimentation section of a tank in one row into the inflow shaft of a bioreactor section of an adjacent tank in the same row, and in the tanks at either end, the breeding water is conducted out of the bypass of the tank at the end of one row into the inflow shaft (bioreactor section) of the tank at the end of the other row. By connecting the fish tanks in this kind of circuit, a large water circuit is provided which offers the advantage that both the metrological effort and the amount of effort and expense associated with water measurement lines for the dosing of reagents can be reduced, since in the most simple case, sample water can be taken from just one fish tank, or for example, only from every third fish tank in the large water circuit, and reagents can be added to one such an individual tank, in order to measure and to stabilise the quality of the water in the entire circuit. Also, this arrangement has the advantage that a larger total volume of water is present in the circuit, as a consequence of which, fluctuations in the water parameters in individual fish tanks need not necessarily manifest themselves immediately in deterioration of the water quality, but can be balanced out, or at least significantly reduced, by the water volumes in other fish tanks.

Two outlet lines for the breeding water are assigned to each fish tank, being numbered 14a, b (FIG. 1) for the bottom right-hand tank 4, by way of example. One outlet line 14a, is used as an overflow and for removing scum, is connected to the bioreactor section, and permits the discharge of surplus water and any scum that has formed from the bioreactor section. The other outlet line 14b is connected to the sedimentation section and permits the discharge of wastewater from the sedimentation section.

All the outlet lines for the breeding water are consolidated via one or more manifolds to a central outlet line 20 (FIG. 1), which opens into a wastewater treatment system 30. In wastewater treatment system 30, the wastewater is treated to comply with the relevant environmental regulations, and can subsequently be discharged directly to surface waters. The wastewater is permanently monitored by a measuring system, not shown, for the respective O2, temperature, NH4, NO3, NO2 PO4, total gas pressure, TOC/COD (total organic carbon/chemical oxygen demand) content, and influenced with specific measures where necessary, in particular with regard to the total phosphorus and nitrogen content.

A supply line for fresh water 40 (FIG. 1) is also provided, which branches via a distributor into a plurality of fresh water supply lines 41-43 which open into the inflow shaft of the respective bioreactor section of tanks 1-3. The water discharged or lost through the outlet lines or otherwise in each of the three water circuits can be compensated for by the fresh water supply, such that a constant water level in the fish tanks can thus be maintained.

Figure 2:
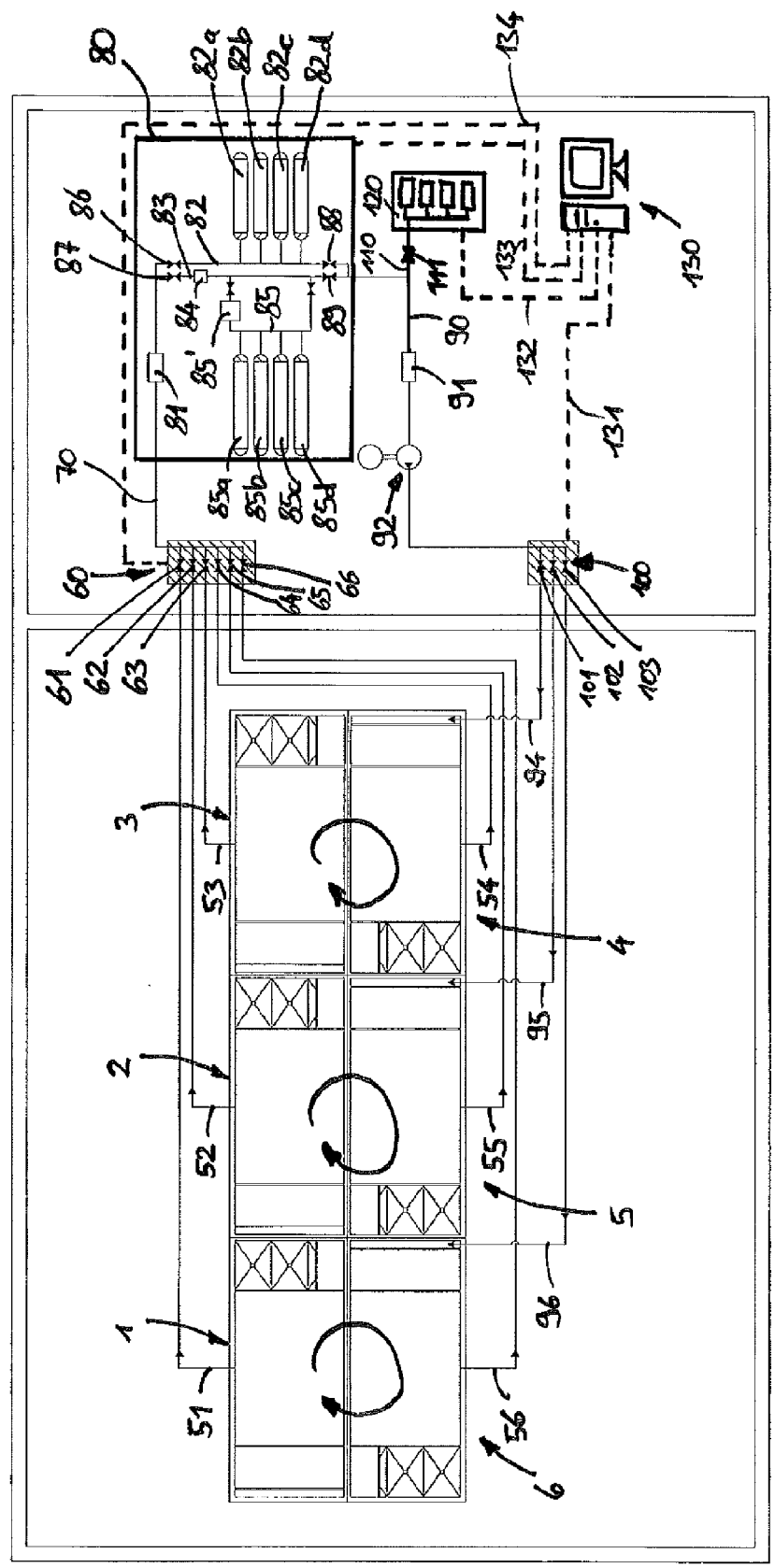
FIG. 2: shows a schematic view of the sample water removal and the analytical devices in the fish tank arrangement of FIG. 1.

FIG. 2 shows schematically the components of the fish tank arrangement in FIG. 1 that are preferred for water analysis. It should be noted that the water circulation aspect of the present invention shown in FIG. 1 is functionally separate and independent from the sample water removal and return lines aspect of the present invention shown in FIG. 2.

As can be seen from FIG. 2, each fish tank has a peripheral measurement line 51-56 that opens into a multiplexer 60. In multiplexer 60, a corresponding plurality of angle seat or solenoid valves 61-66 are disposed, each of which connects the connector of one of the peripheral measurement lines 51-56 to a collector line inside multiplexer 60, which in turn is connected to a central measurement line 70.

The flow of water through the central measurement line 70 is monitored by a flow monitor 81 disposed inside a measuring unit 80.

Downstream from flow monitor 81, the central measurement line 70 branches inside measuring unit 80 into a first measurement arm 82 and a second measurement arm 83. The two measurement arms 82, 83 run parallel, and after passing through the measuring unit 80, are consolidated again to form a central return line 90.

The first measurement arm 82 is connected to a plurality of physical sensors that are connected in series one after the other in measurement arm 82. In detail, an oxygen and temperature sensor 82a, a pH sensor 82b, a conductivity sensor 82c and a gas pressure sensor 82d are arranged one after the other, and analyze the sample water flowing through measurement arm 82.

The second measurement arm 83 firstly passes through a filter 84 for permeate production and is then connected by means of a further bypass 85 to a total of four wet chemical measuring units connected in series with bypass 85. The wet chemical measuring units are a first measuring unit 85a for detecting $NH_4/NO_3/NO_2$-/Ntotal, a second measuring unit 85b for detecting $PO_4^{3-}$/Ptotal, a measuring unit 85c for detecting the total organic carbon (TOC) and a measuring unit 85d for detecting the alkalinity, which is synonymous here for carbonate hardness (SBV; $HCO_3^-$).

Each of the two measurement arms 82, 83 can be closed or blocked, on the inlet side or on the outlet side, by valves 86, 87 and 88, 89, which are disposed upstream and downstream, respectively, which allows the measurement arms to be rinsed. In addition, the sample water can be channeled from the second measurement arm 83 via an inlet/outlet valve 87', 89' into bypass 85 in order to subject it to discontinuous wet chemical analysis by measuring units 85a-d. For this purpose, there is provided in bypass 85 a water reservoir 85', which can be cleaned of any residues from a previous measurement by flushing the bypass 85 with sample water, and which can also receive a defined volume of water, for example 5 liters, in preparation for wet chemical analysis. From this defined volume of water, the individual wet chemical measuring units 85a-d then obtain a volume required to perform their measurements, for example 250 ml in each case. The remainder is then conducted out of the water reservoir 85' via bypass 85 and valve 89 to central return line 90. The sample water portions analyzed in the wet chemical measuring units 85a-d are discarded and added to the wastewater.

In this way, it is possible to subject a mixed sample from a stream flowing through arm 85 to wet chemical analysis, in order to perform a real-time analysis. Alternatively, the container 85' can be filled once, with single samples then being removed from it and analyzed.

After consolidation of the first and second measurement arms 82, 83 into central return line 90, the latter opens into an ozone generator 91 which disinfects the returning sample water. A pump 92 disposed downstream from ozone generator 91 is designed as a positive displacement pump, and conveys the returning sample water back to the fish tanks 1-6. In this regard, the entire system is configured and designed in such a way that sample water flows by gravity only from the fish tanks via multiplexer 60 as far as measuring unit 80, and from there to pump 92, so that the water is supplied to the positive displacement pump 92 without any suction effect on the inlet side.

The returning sample water is then fed by pump 92 to a multiplexer 100, which divides the central return line 90 into three peripheral return lines 94, 95, 96, each of which can be opened or closed by separate angle seat or solenoid valves 101-103 on the inlet side. Peripheral return lines 94-96 open into fish tanks 4-6, such that the regulated or targeted return of the sample water into one of these three tanks is possible by switching the angle seat or solenoid valves 101-103 accordingly in multiplexer 100.

Not only the sample water flowing out of measuring unit 80 is fed into central return line 90 in order to be returned to the fish tanks, but a dosing line 110 is also provided, which opens into the return line downstream from the merging of the two parallel measurement arms 82, 83, and upstream from feed pump 92. Dosing line 110 can be closed by a valve 111, which connects a dosing unit 120 to the return line. Reagents which stabilise the quality of the water in the fish tanks can be fed into the return line from dosing unit 120. The reagents added in doses in this manner are fed to multiplexer 100 via the return line 90, and can then be fed in a regulated or targeted manner by means of the multiplexer to one of tanks 4, 5 or 6 via peripheral return lines 94-96. In this way, a reagent can be fed in a controlled or targeted way to one of the three water circuits within the fish tank system, in order to control the water quality in the water circuit.

Dosing unit 120, measuring unit 80, multiplexer 60 and multiplexer 100 have a signal coupling to a control unit 130, as shown by broken lines 131-134 in FIG. 2. Control unit 130 is used to assign the measured values captured by measuring unit 80 to a respective fish tank or to a water circuit comprising two fish tanks, by taking the respective position of multiplexer 60 into consideration, which thus makes it possible to determine from which fish tank the sample water that has been measured actually originated. Parameter ranges defining a permissible and/or an optimal water quality are stored in control unit 130. A suitable comparator unit is also provided, which can compare the measured values with this parameter range. On the basis of that comparison, control unit 130 is able to detect any deviation, and determine the resultant type and amount of reagents that need to be dosed. The type and amount of reagents are communicated to dosing unit 120 and multiplexer 100 is simultaneously switched in such a way that the dosage of reagents emitted by dosing unit 120 is fed to the respective water circuit. This permits reliable and fast control of the water quality in an automated manner for all the water circuits within the fish tank system, without substantial investments having to be made in sensor systems, lines and switching devices.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A fish tank apparatus, comprising:
   a plurality of fish tanks shaped to contain therein water for fish;
   a measuring apparatus for detecting at least one parameter of the water in which the fish are kept in said fish tanks, including:
   a measuring member for detecting the at least one water parameter;
   a switchable sample water diverting member having a plurality of inlets and at least one outlet;
   a central measurement conduit fluidically connecting said outlet of said switchable sample water diverting member with said measuring member to conduct sample fish tank water from said switchable sample water diverting member to said measuring member;
   a plurality of peripheral measurement conduits, each fluidically connecting an associated one of said fish tanks with said inlets of said switchable sample water diverting device to conduct sample fish tank water from said fish tanks to said switchable sample water diverting member; and wherein said switchable sample water diverting member is configured to selectively feed sample water from each one of said peripheral measurement conduits to said central measurement conduit to test the water in said fish tanks.

2. A fish tank apparatus as set forth in claim 1, wherein:
said measuring member includes at least one of a pH-sensor, an oxygen sensor, a gas pressure sensor and/or a temperature sensor, which converts a parameter of the sample fish tank water into an electrical signal.

3. A fish tank apparatus as set forth in claim 1, wherein:
said measuring member includes at least one of a measuring unit for detecting the phosphate content, a measuring unit for detecting the hydrocarbonate content, a measuring unit for detecting ammonia, nitrite and nitrate and the total nitrogen content, and/or a measuring unit for detecting the total organic carbon, which converts a parameter of the sample fish tank water into an electrical signal after the addition of at least one reagent to the sample fish tank water.

4. A fish tank apparatus as set forth in claim 1, including:
At least one return conduit fluidically connecting said measuring member with said fish tanks to return the sample fish tank water to said fish tanks.

5. A fish tank apparatus as set forth in claim 4, including:
an ozone generator fluidically connected between said measuring member and said fish tanks and communicating therewith for disinfecting the sample fish tank water before it is returned to said fish tanks through said return conduit.

6. A fish tank apparatus as set forth in claim 1, including:
a switchable return water diverting device fluidically connected by a central return line to said measuring member to return the sample fish tank water;
a plurality of peripheral return lines fluidically connecting said switchable return water diverting device with an associated one of said fish tanks or to a circuit consisting of a plurality of said fish tanks in order to return the sample fish tank water; and
wherein said switchable return water diverting device is configured to selectively feed sample water selectively from said central return line to each one of said peripheral return lines.

7. A fish tank apparatus as set forth in claim 6, including:
a measurement control unit which has a signal connection to said switchable sample water diverting device and to said measuring member, and which for each fish tank that is fluidically connected via a peripheral measurement line to the switchable sample water diverting device is configured to:
a. transmit a first switching signal to said switchable sample water diverting device for conducting sample water from said peripheral measurement line of the associated one of said fish tanks into said central measurement line;
b. send, where relevant, a start signal to said measuring unit to initiate a measurement in said measuring unit;
c. detect values measured by said measuring unit and store and/or forwarding said measured values; and wherein
d. said measurement control unit is configured to transmit prior thereto a second switching signal to said switchable return water diverting device, in order to conduct sample water from said central return line to an associated one of said peripheral return lines assigned to said respective fish tank;

e. said measurement control unit comprises a time-delay unit and is configured to allow a period of time predetermined by the time-delay unit to elapse between transmission of the first switching signal and transmission of the start signal, said period being sufficient for said central measurement line and said measuring unit to be completely filled with sample water from said fish tank being measured; and said measurement control unit is configured to perform functions a-c and, if necessary, d and/or e successively for each of said fish tanks.

8. A fish tank apparatus as set forth in claim 1, including:
a positive displacement pump; and wherein
said fish tanks, said peripheral measurement lines and said central measurement line are arranged in such a way that the sample water from said fish tanks is fed to said measuring member by gravity only, and said measuring apparatus is disposed upstream from said positive displacement pump for conveying the sample fish tank water.

9. A fish tank apparatus as set forth in claim 1, including:
a control unit which has a signal connection to said measuring apparatus and which is configured to compare the values measured by said measuring apparatus with setpoint values and, in the event that the measured values deviate from the setpoint value, to output a signal indicating which measured value is deviating.

10. A fish tank apparatus as set forth in claim 9, wherein:
said control unit is configured to output a correcting variable for adding a substance to said fish tank being measured, said correcting variable being so designed that when the substance is added to said fish tank, the measured parameter is changed in the direction of the setpoint value and is preferably changed to the setpoint value, wherein said control unit preferably has a signal coupling to a dosing unit for dosing the substance.

11. A fish tank apparatus as set forth in claim 10, wherein:
said plurality of fish tanks or some of said fish tanks are interconnected to form a semi-closed water circuit, and said control unit is configured to output a correcting variable for adding a substance to that one of said fish tanks which fluidically is in the water circuit immediately preceding said fish tank being measured, wherein said control unit preferably has a signal coupling to said dosing unit for dosing the substance to said fish tank which fluidically immediately precedes said fish tank being measured.

12. A fish tank apparatus as set forth in claim 1, including:
a return line for returning the sample water to said fish tanks;
a supply line for dosing reagents to regulate the fish tank water quality which opens into said return line, preferably upstream from a switchable return water diverting device which selectively diverts returning sample water into one of a plurality of peripheral return lines and which connects said return lines to an automated dosing unit.

13. A measuring apparatus for a plurality of fish tanks, comprising:
a measuring member for detecting the at least one water parameter;
a switchable sample water diverting device fluidically connected by a central measurement line to said measuring member for conducting sample water;
a plurality of peripheral measurement conduits, each of which fluidically connects an associated one of said fish tanks to said switchable sample water diverting device for conducting sample water; and wherein said switchable sample water diverting device is configured to selectively feed sample water from each one of said peripheral measurement conduits to said central measurement line.

14. A method for monitoring water quality in a plurality of fish tanks, comprising:

switching a switchable sample water diverting device to conduct sample water from a peripheral sample water line into a central measurement line;

channelling sample water from a fish tank via the peripheral sample water line and the central measurement line to a measuring unit;

measuring in the measuring unit at least one parameter of the water in the fish tank;

returning the sample water to the fish tank, where relevant;

switching the switchable sample water diverting device to conduct the sample water from a further peripheral sample water line into a central measurement line;

conducting sample water from a further fish tank via the further peripheral sample water line to the measuring unit;

measuring in the measuring unit at least one parameter of the water in the further fish tank; and returning the sample water to the further fish tank, where relevant.

15. A method as set forth in claim 14, wherein:

between said switching step and said measuring step providing a predetermined time delay that is sufficient for the measuring unit to be completely filled with sample water from the fish tank being measured.

* * * * *